US00RE50789E

(19) United States
(12) Reissued Patent
Lehner et al.

(10) Patent Number: US RE50,789 E
(45) Date of Reissued Patent: Feb. 10, 2026

(54) FRONT UNIT FOR A TOURING BINDING

(71) Applicant: Salewa Sport AG, Denges (CH)

(72) Inventors: Edwin Lehner, Aschheim (DE); Michael Zimmermann, Aschheim (DE)

(73) Assignee: Salewa Sport AG, Denges (CH)

(21) Appl. No.: 18/410,735

(22) Filed: Jan. 11, 2024

Related U.S. Patent Documents

Reissue of:
(64) Patent No.: 11,648,456
Issued: May 16, 2023
Appl. No.: 17/354,308
Filed: Jun. 22, 2021

(30) Foreign Application Priority Data

Jun. 22, 2020 (DE) ..... 10 2020 116 389.4

(51) Int. Cl.
*A63C 9/08* (2012.01)

(52) U.S. Cl.
CPC ..... *A63C 9/08* (2013.01)

(58) Field of Classification Search
CPC ..... A63C 9/086; A63C 9/08; A63C 9/001; A63C 9/08528; A63C 9/002
See application file for complete search history.

(56) References Cited

U.S. PATENT DOCUMENTS

| | | | | |
|---|---|---|---|---|
| 9,039,031 | B2 * | 5/2015 | Soldan | A63C 9/0807 280/607 |
| 11,364,430 | B2 * | 6/2022 | Kogler | A63C 9/0807 |
| 11,648,456 | B2 | 5/2023 | Lehner et al. | |
| 2011/0298196 | A1 * | 12/2011 | Lehner | A63C 9/0807 280/611 |

(Continued)

FOREIGN PATENT DOCUMENTS

| | | | | |
|---|---|---|---|---|
| CH | 706664 | A1 * | 12/2013 | A63C 9/0807 |
| DE | 102012206880 | A1 * | 10/2013 | A63C 9/00 |

(Continued)

OTHER PUBLICATIONS

U.S. Appl. No. 17/354,308 , "Corrected Notice of Allowability", Jan. 26, 2023, 13 pages.

(Continued)

*Primary Examiner* — Matthew J Kasztejna
(74) *Attorney, Agent, or Firm* — Kilpatrick Townsend & Stockton LLP

(57) ABSTRACT

A front unit for a touring binding, comprising: two lateral bearing portions arranged on a ski transverse axis, wherein, when the front unit is in a closed position, the two lateral bearing portions are configured to engage lateral counter bearing portions of a ski boot to hold the ski boot on the front unit so that the ski boot can pivot about the ski transverse axis; and a longitudinal positioning portion on which the ski boot can be supported, wherein the counter bearing portions are positioned for engagement relative to the bearing portions, the front unit being shiftable between an open position and the closed position, wherein the bearing portions and the counter bearing portions are disengaged in the open position and engaged in the closed position, wherein the longitudinal positioning portion, relative to the bearing portions, is secured in the open position and movable in the closed position.

12 Claims, 3 Drawing Sheets

(56) References Cited

U.S. PATENT DOCUMENTS

Figure 1:
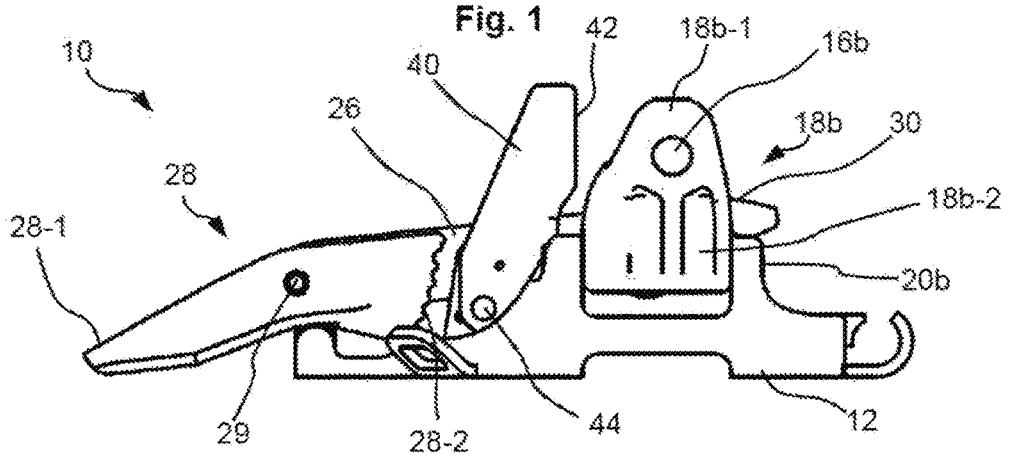

| | | | | | |
|---|---|---|---|---|---|
| 2014/0021696 | A1* | 1/2014 | Soldan | ..... | A63C 9/08542<br>280/625 |
| 2015/0290524 | A1* | 10/2015 | Soldan | ..... | A63C 9/0807<br>280/615 |

FOREIGN PATENT DOCUMENTS

| | | | | | |
|---|---|---|---|---|---|
| DE | 202011110534 | U1 * | 8/2014 | ..... | A63C 9/0807 |
| DE | 202011110656 | U1 * | 7/2015 | ..... | A63C 9/0807 |
| EP | 0254094 | * | 1/1988 | | |
| EP | 2722081 | A1 * | 4/2014 | ..... | A63C 9/0807 |
| EP | 2737929 | A1 * | 6/2014 | ..... | A63C 9/0807 |
| EP | 2353673 | B1 * | 8/2014 | ..... | A63C 9/0807 |
| EP | 2946817 | A1 * | 11/2015 | ..... | A63C 9/002 |
| EP | 2965791 | A1 * | 1/2016 | ..... | A63C 9/0807 |
| EP | 2946817 | B1 * | 5/2017 | ..... | A63C 9/002 |
| EP | 3266504 | A1 * | 1/2018 | | |
| FR | 2567409 | A1 * | 2/1984 | | |
| FR | 2634134 | * | 1/1990 | | |
| FR | 2991592 | A1 * | 12/2013 | ..... | A63C 9/003 |
| WO | WO-2009121187 | A1 * | 10/2009 | ..... | A63C 7/12 |

OTHER PUBLICATIONS

U.S. Appl. No. 17/354,308 , "Non-Final Office Action", Jul. 5, 2022, 21 pages.
U.S. Appl. No. 17/354,308 , "Notice of Allowance", Jan. 5, 2023, 17 pages.

* cited by examiner

FRONT UNIT FOR A TOURING BINDING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED [APPLICATION] *APPLICATIONS*

This application *is a reissue application of U.S. Pat. No. 11,648,456, which* claims priority to German Patent Application No. 10 2020 116 389.4, filed in Germany on Jun. 22, 2020, the entire contents of which are hereby incorporated herein by this reference.

DESCRIPTION

The present invention relates to a front unit for a touring binding, comprising two lateral bearing portions which are arranged on a ski transverse axis that extends substantially orthogonally to a ski longitudinal axis and parallel to a ski plane and which are designed to engage lateral counter bearing portions of a ski boot when the front unit is in a closed position in order to hold the ski boot on the front unit such that it can pivot about the ski transverse axis, and a longitudinal positioning portion on which the ski boot can be supported in an entry position in such a way that the counter bearing portions are positioned, with regard to their position along the ski longitudinal axis, in a position ready for engagement relative to the bearing portions, the front unit being shiftable between an open position, in which the bearing portions and the counter bearing portions are disengaged, and the closed position, in which the bearing portions and the counter bearing portions are engaged.

Front units for touring bindings of this type are fastened in particular to skis, in particular touring skis, and used together with a heel unit such that, for the ascent, the front unit can be placed in a walking position in which the front unit releases a ski boot heel and the boot can pivot freely about the bearing portions and, for the descent, the front unit can be placed in a descent position in which the heel unit holds the ski boot heel securely on the ski.

An example of such a front unit known from the prior art for a touring binding of the type mentioned at the outset is disclosed in EP 2 737 929 A1. The front unit disclosed in EP 2 737 929 A1 comprises two lateral, inward-facing pins as bearing portions, which engage in corresponding lateral holes in a front portion of a ski boot. The pins are arranged at distal ends of respective clamping brackets, the clamping brackets, in order to open and close the front unit, being pivotably held on the front unit and being movable between an open position and a closed position by means of a binding actuation arrangement. When being put into the known front unit, the ski boot must be positioned such that its lateral bearing holes are exactly opposite the bearing pins of the front unit, such that the bearing pins can snap into the bearing openings when the front unit is closed. Correct positioning of the ski boot can often prove difficult in practical use on the mountain, in particular for inexperienced users. In order to make it easier to find the correct entry position for the ski boot, EP 2 737 929 A1 proposes additionally providing a longitudinal stop for a front portion of the ski boot on the front unit, the longitudinal stop, in the open position of the front unit, being put in a first upright position in order to support the ski boot in the entry position and, in the closed position of the front unit, being put in a forwardly folded second position in which it allows the ski boot to pivot about the bearing portions for walking. The longitudinal stop is preloaded in the direction of the second position and, in the open position, can be locked in the first position in order to provide the entry aid. When the front unit is shifted from the open position into the closed position, the longitudinal stop is automatically shifted from the first position into the second position. Accordingly, the longitudinal stop provides the desired entry aid in the open position, the movement or shifting of the front unit taking place anyway for closing the front unit and for transitioning to the closed position being used at the same time for moving or shifting the longitudinal stop into the second position, in which the longitudinal stop does not hinder the pivoting movement of the ski boot. This automatic shifting of the longitudinal stop when shifting the front unit into the closed position takes place via a coupling element which is coupled to the binding actuation arrangement, in particular to an actuation lever, and to the longitudinal stop itself in order to transmit a shifting movement of the binding actuation arrangement to the longitudinal stop.

By means of this entry aid, entry into the touring binding can be made much easier, but coupling the movement of the longitudinal stop with that of the actuation arrangement of the front unit also brings problems. For example, this makes movable binding parts susceptible to functional failure. In addition, an additional component in the form of a coupling element is required for transmitting the shifting movement, which in the case of EP 2 737 929 A1 is implemented as an additional control lever. However, the provision of a plurality of components almost inevitably leads to higher production costs, a higher weight and, as mentioned above, to a greater vulnerability with regard to functionality.

Against this background, it is the object of the present invention to provide a front unit for a touring binding which, taking into account the production costs and the weight of the front unit, has improved functionality and operability in order to avoid the above-mentioned disadvantages of the prior art and which in particular simplifies correct positioning of the boot during entry.

The above-mentioned object of the invention is achieved by a front unit for a touring binding, comprising two lateral bearing portions which are arranged on a ski transverse axis that extends substantially orthogonally to a ski longitudinal axis and parallel to a ski plane and which are designed to engage lateral counter bearing portions of a ski boot when the front unit is in a closed position in order to hold the ski boot on the front unit such that it can pivot about the ski transverse axis, and a longitudinal positioning portion on which the ski boot can be supported in an entry position in such a way that the counter bearing portions are positioned, with regard to their position along the ski longitudinal axis, in a position ready for engagement relative to the bearing portions, the front unit being shiftable between an open position, in which the bearing portions and the counter bearing portions are disengaged, and the closed position, in which the bearing portions and the counter bearing portions are engaged, wherein the longitudinal positioning portion is secured relative to the bearing portions in the open position of the front unit and can be moved relative to the bearing portions in the closed position of the front unit.

An important feature of the invention is therefore that, in the closed position of the front unit, the longitudinal positioning portion can move in relation to the front unit or the bearing portions, in particular can move with the ski boot with every step so as not to limit the freedom of movement of the ski boot when walking and to allow pivoting of the ski boot in the closed position of the front unit.

Movement coupling for shifting the longitudinal positioning portion using movable parts of the front unit provided for shifting the front unit between the open position and closed position is therefore not necessary, since the longitudinal positioning portion is movable relative to the bearing portions, about which the ski boot pivots when walking, and can thus be easily moved away by means of the ski boot when walking.

Within the context of this disclosure, in order to simplify visualisation, terms such as "top", "bottom", "front", "rear", "lateral", "vertical direction", "width direction", "longitudinal direction" and the like relate to the point of view of a skier who has got into the front unit of a ski binding, in particular touring binding, mounted on a ski using a ski boot, the ski being arranged in a horizontal plane.

Furthermore, the term "ski" as well as the terms containing this term, such as "ski boot", "ski binding", "touring ski binding", "ski plane", "ski longitudinal axis", "ski central axis", "ski width direction", "ski longitudinal direction" and the like, not only refer to skis in the narrower sense, but also includes cross-country skis, splitboards (snowboards that can be divided lengthways into at least two parts, the individual parts of which can be used in the manner of normal skis), snowshoes or similar boards for walking or gliding on snow and ice. All of these objects or parts thereof are regarded as skis or parts of skis for the purposes of this invention.

In the open position, the longitudinal positioning portion can be put in a first position for supporting the ski boot in the entry position, the longitudinal positioning portion being locked in the first position in the open position and, in the closed position, being shiftable between the first position and a second position, in which it allows the ski boot to pivot about the ski transverse axis for walking, the longitudinal positioning portion being locked neither in the first position nor in the second position in the closed position. This makes it possible for an entry aid for correct positioning of the ski boot relative to the bearing portions to be provided only in the open position by means of the locked longitudinal positioning portion, while in the closed position the longitudinal positioning portion is not locked and thus a movement of the front portion of the ski boot, in particular a pivoting of the ski boot about the bearing portions and the ski transverse axis, is not hindered.

A longitudinal positioning portion which can be shifted between a first and a second position may preferably also be preloaded in the direction of the first position by a resilient means. By preloading in the direction of the first position, it is not necessary to manually move or shift the longitudinal positioning portion into the first position in order to support the ski boot in the open position of the front unit or for the movement to be coupled with that of an actuation arrangement of the front unit or the like. In particular, in the open position, the longitudinal positioning portion, which is preloaded into the first position and locked in the first position, can provide support for the ski boot and thus an entry aid, while in the closed position, in particular in a walking position of the closed position, the longitudinal positioning portion moves together with the front portion with every step and an accompanying pivoting of the ski boot about the ski transverse axis. Such a movement of the longitudinal positioning portion can take place from the first position to the second position counter to the preload force of the resilient element, which is why it is advantageous if the spring force of the resilient element is designed to be as low as possible. The spring force should be just sufficient to reliably bring the longitudinal positioning portion into the first position.

In a preferred embodiment of the present invention, the resilient means may be a leg spring. A leg spring generally has lower spring forces than, for example, compression or tension springs and, moreover, only takes up very little installation space, as a result of which a compact arrangement can be achieved. In a case where the longitudinal positioning portion is mounted pivotably about a shaft, a leg spring can advantageously be used such that it is arranged around the same shaft.

In addition, the front unit may also comprise an actuation arrangement which is designed to shift the front unit from the open position into the closed position when actuated by a user and thereby move the bearing portions towards one another. The actuation arrangement may also be designed to secure the longitudinal positioning portion in the first position. No additional components are therefore required in order to secure or lock the longitudinal positioning portion in the first position, as a result of which production costs, weight and installation space can be reduced.

The actuation arrangement may preferably comprise an actuation lever on which a detent pin is arranged, which is designed to engage in a corresponding detent notch arranged on the longitudinal positioning portion in the open position of the front unit in order to lock the longitudinal positioning portion in the first position in the open position of the front unit. The longitudinal positioning portion can be reliably locked in the first position by means of the detent pin and detent notch. It should be noted that other locking options, such as an integrally formed projection and a corresponding complementarily formed recess, are also possible. The detent pin or projection may also be formed on the longitudinal positioning portion and the complementary notch or recess may be formed on the actuation lever. It only has to be ensured that the longitudinal positioning portion can be securely locked in the first position in the open position of the front unit in order to provide the entry aid.

In particular, the longitudinal positioning portion may be arranged in front of the bearing portions in a ski longitudinal direction. This advantageous arrangement allows the longitudinal positioning portion to interact with the front portion of the ski boot in order to provide support and thus an entry aid for positioning the ski boot.

In a preferred embodiment, the longitudinal positioning portion may comprise at least one stop against which a front portion of the ski boot strikes in the entry position. A direct interaction between the ski boot and the longitudinal positioning portion in the form of a direct stop can provide the user with the best possible feedback and thus a very good entry aid for correctly positioning the ski boot relative to the bearing portions in the ski longitudinal direction. It should be noted that a plurality of stops may also be provided. In particular, two stops arranged symmetrically with respect to the ski longitudinal axis may be provided. In this case, the user can move their ski boot such that it rests against both stops. As a result, in addition to correct positioning in the ski longitudinal direction, twisting of the ski boot to the side about a vertical axis can also be prevented, as a result of which ease of entry can be further improved.

The longitudinal positioning portion may also be mounted on the front unit on a bearing shaft that extends substantially orthogonally to the ski longitudinal axis and parallel to the ski transverse axis. Thus, the longitudinal positioning portion can pivot with the ski boot in the closed or walking position of the front unit during ascent and pivoting of the ski boot about the ski transverse axis is not hindered by the longitudinal positioning portion.

The front unit may further comprise a base plate having a fastening arrangement for fastening the front unit to a ski, the bearing shaft on which the longitudinal positioning portion is mounted being arranged on the base plate. Arranging the longitudinal positioning portion on a base plate that is secured to the ski is particularly advantageous, since the longitudinal positioning portion can thereby be locked particularly securely in the first position. In addition, it is not necessary to couple the movement of the longitudinal positioning portion with that of other movable components of the front unit, as a result of which reliable functioning of the front unit is not impaired.

In the first position, the longitudinal positioning portion can protrude upwards substantially perpendicularly from the front unit and, in the second position, can be pivoted away forwards and downwards about the bearing shaft such that it approaches the ski plane during the transition from the first position to the second position. In other words, the longitudinal positioning portion can protrude perpendicularly upwards in the open position of the front unit when it is locked in the first position, and in the closed position, in particular a walking position, of the front unit, it can pivot away forwards and downwards about the bearing shaft into the second position.

Figure 2:
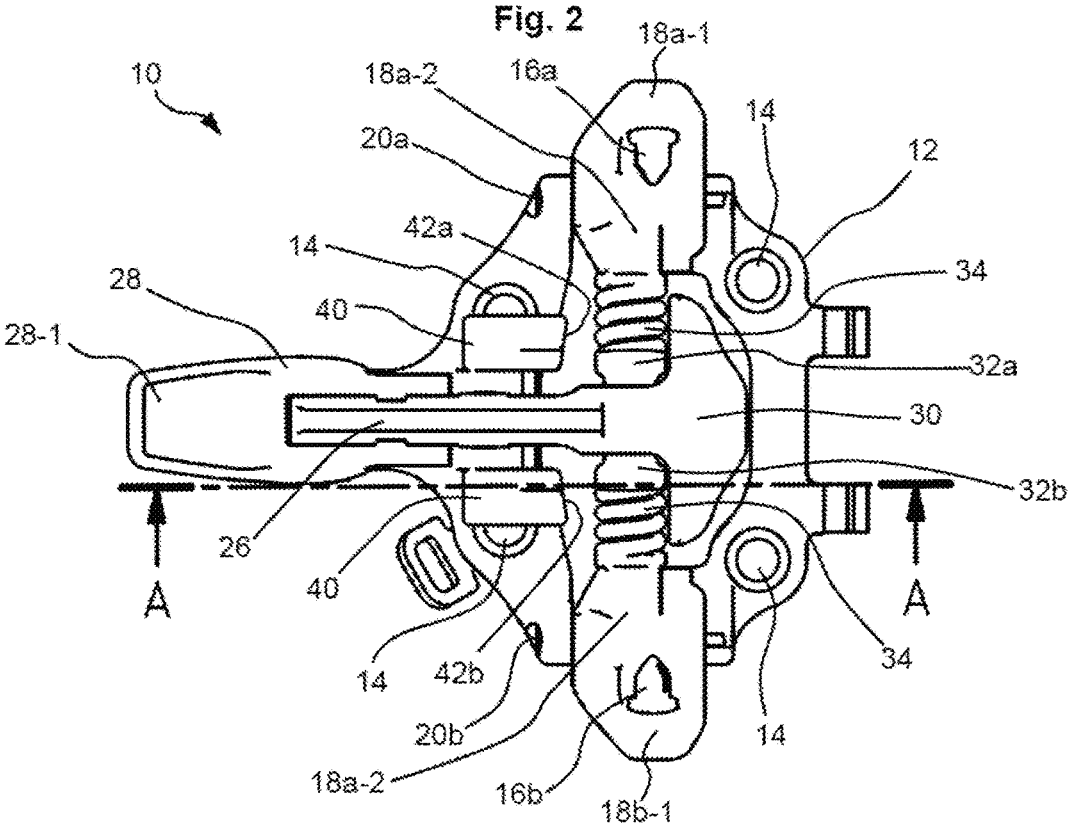
Figure 3:
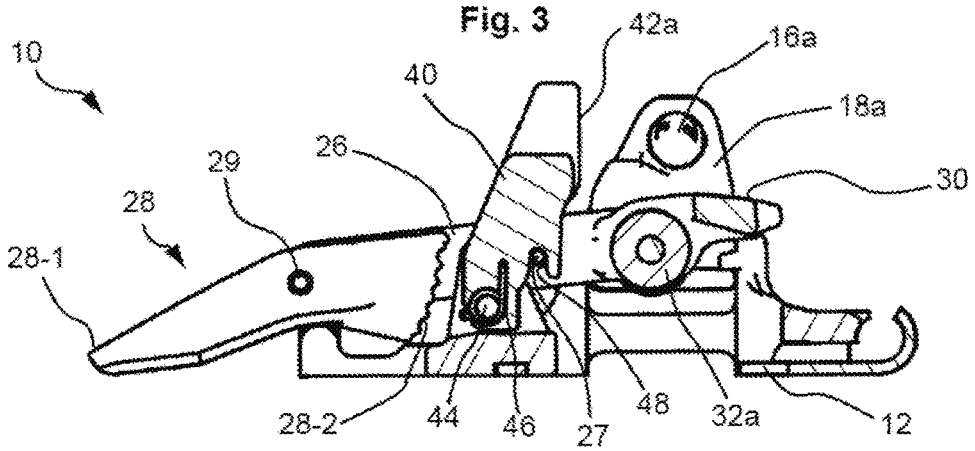
Figure 4:
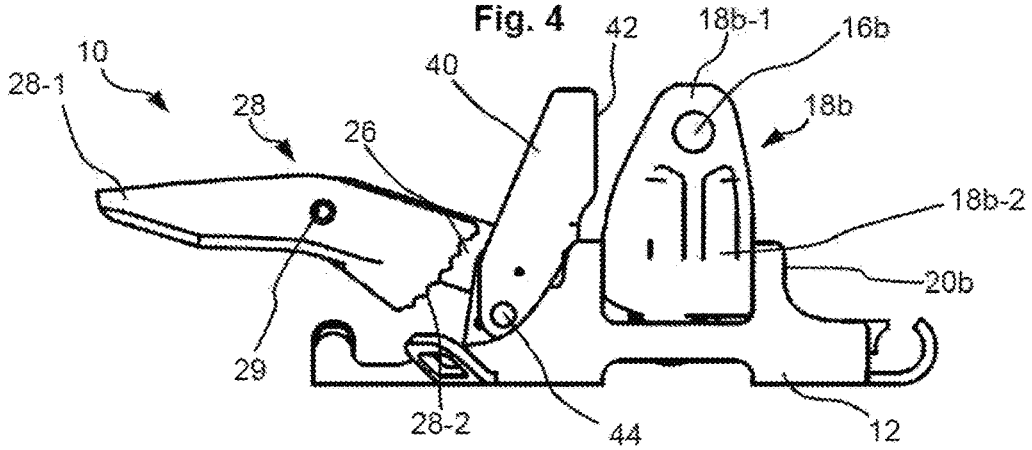
Figure 5:
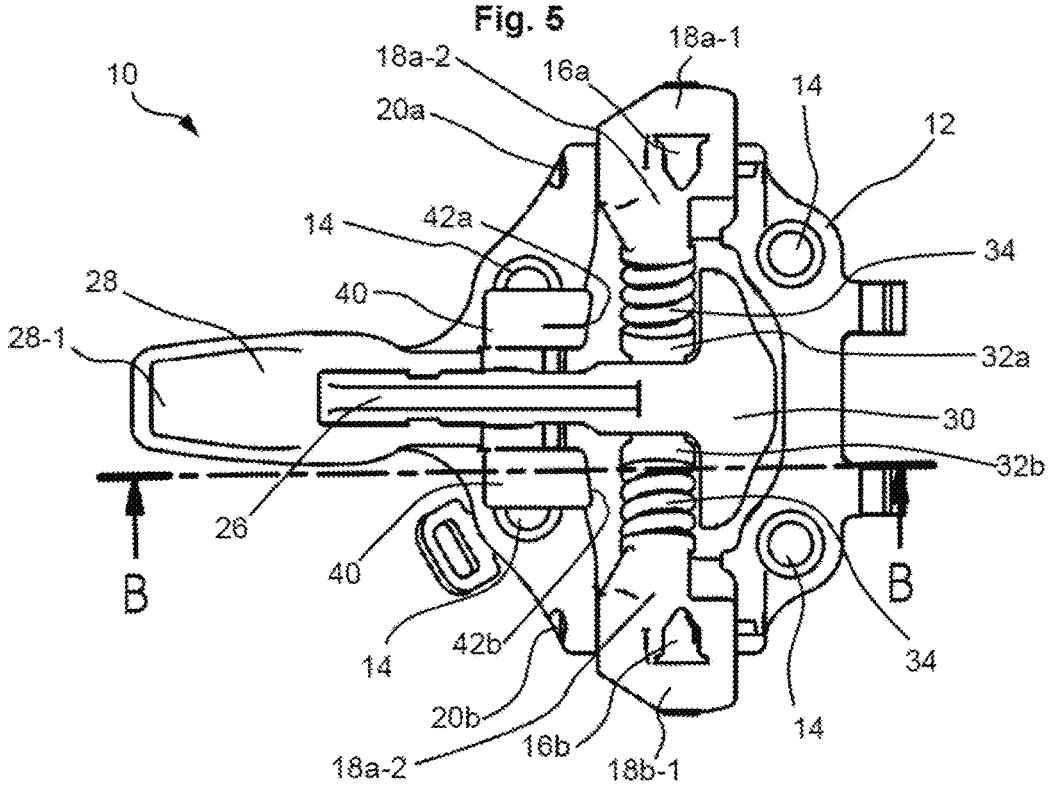
Figure 6:
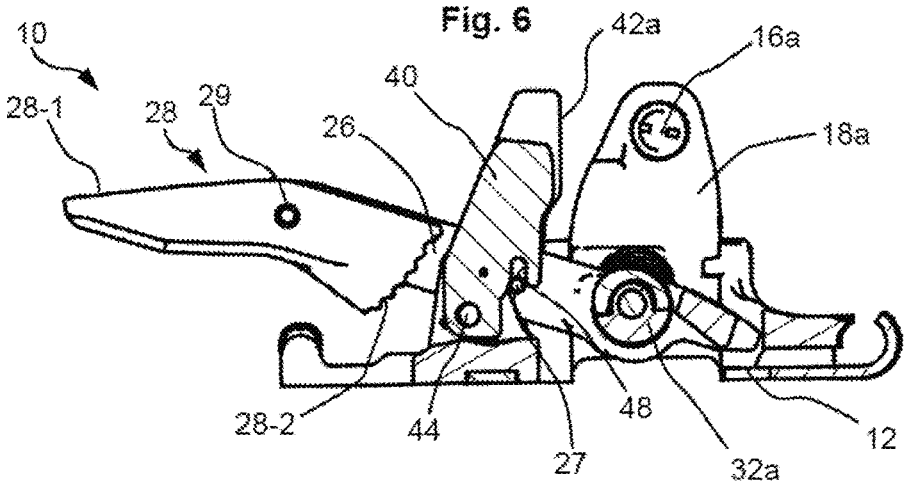
Figure 7:
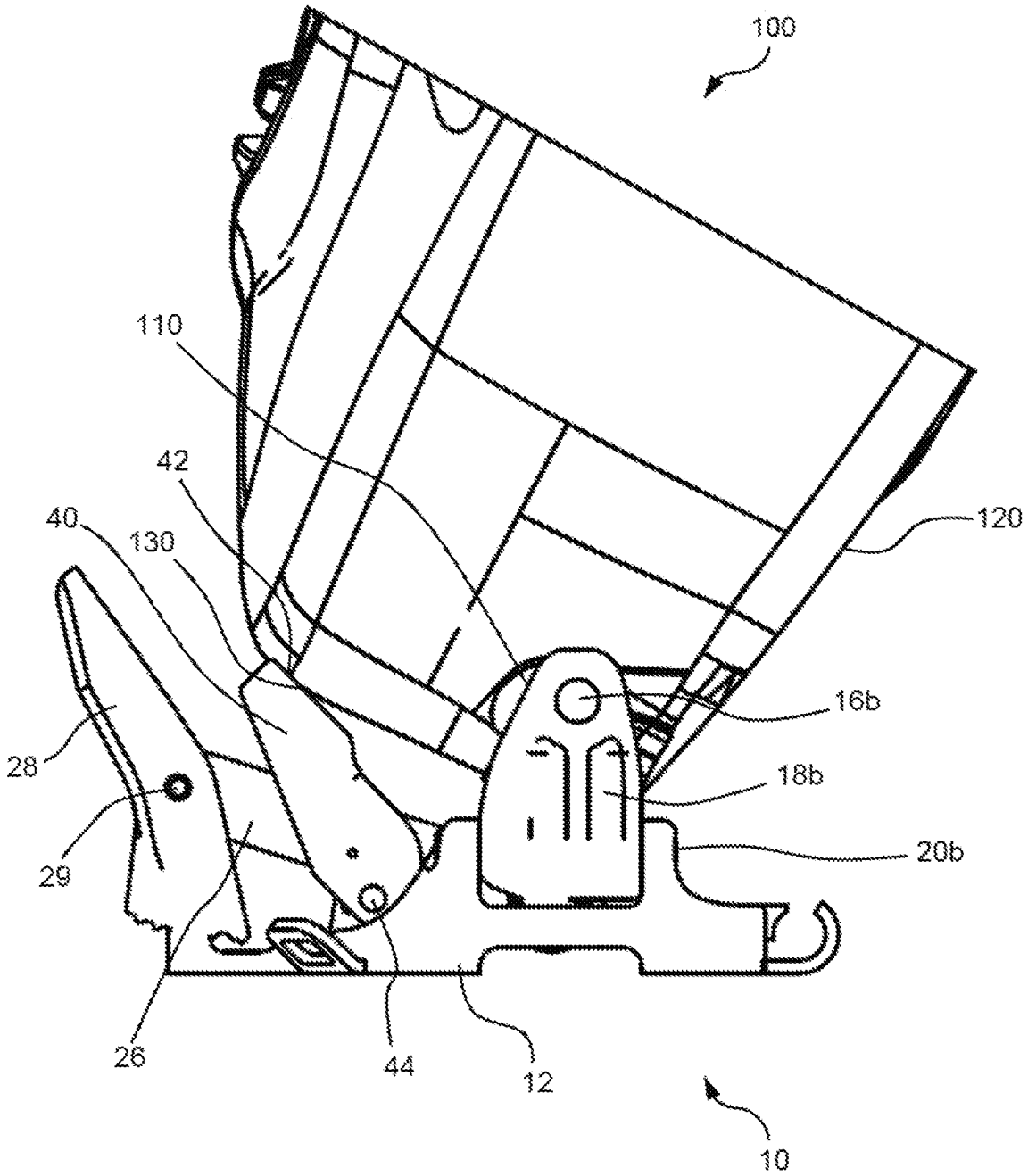

The invention is explained in more detail below on the basis of a preferred embodiment with reference to the accompanying drawings, in which:

FIG. 1 is a side view of a front unit for a touring binding according to the embodiment of the present invention in an open position, FIG. 2 is a plan view of the front unit according to the embodiment of the present invention in the open position, FIG. 3 is a sectional view along the line A-A in FIG. 2, FIG. 4 is a side view of the front unit according to the embodiment of the present invention in a closed or descent position, FIG. 5 is a plan view of the front unit according to the embodiment of the present invention in the closed or descent position, FIG. 6 is a sectional view along the line B-B in FIG. 5, and FIG. 7 is a side view of the front unit according to the embodiment of the present invention in the closed or a walking position and coupled to a toe portion of a ski boot.

In the present disclosure, directional and location information such as "up", "down", "left", "right", "front", "rear", "vertical", "horizontal" or the like relate to a state of the touring binding or front unit of the touring binding in which it is mounted so as to be ready for operation and in which it is fastened to a ski, for example, and the observer who understands these terms is standing on a horizontal subsurface and is looking forwards in the direction of travel of the skis. An axis extending in the X direction then extends parallel to the viewing direction and parallel to the ski longitudinal axis, a Y direction extends orthogonally to the X direction and parallel to the horizontal subsurface or to the ski plane and to the ski transverse axis, and a Z direction extends orthogonally to the X direction and to the Y direction in the vertical direction to the horizontal subsurface.

The front unit 10 of the preferred embodiment of the invention shown in FIGS. 1 to 7 comprises two lateral bearing portions 16a, 16b, which are arranged on a ski transverse axis that extends substantially orthogonally to a ski longitudinal axis and which are designed to engage lateral counter bearing portions 110 of a ski boot 100 in order to keep the ski boot 100 pivotable about the ski transverse axis.

The front unit 10 further comprises a longitudinal positioning portion 40 on which the ski boot 100 can be supported in an entry position in such a way that the counter bearing portions 110 are positioned, with regard to their position along the ski longitudinal axis, in a position ready for engagement relative to the bearing portions 16a, 16b.

The front unit 10 is in principle shiftable between an open position, which is shown in FIGS. 1 to 3, and a closed position, which is shown in FIGS. 4 to 7. In the closed position, there is a gap between the bearing portions 16a, 16b that is designed for engagement with the counter bearing portions 110 of the ski boot 100, while in the open position there is a gap that is greater than in the closed position, such that the ski boot 100 can be inserted between the bearing portions 16a, 16b or removed from the front unit 10. In other words, the bearing portions 16a, 16b and the counter bearing portions 110 are engaged in the closed position and disengaged in the open position. As mentioned, the open position of the front unit 10 is shown in FIGS. 1 to 3, while the closed position is shown in FIGS. 4 to 7. A descent position is shown in FIGS. 4 to 6 and a walking position is shown in FIG. 7. In the descent position, the front unit 10 is set up for downhill skiing and a heel unit (not shown) can hold a heel portion of the ski boot securely on the ski. The front unit 10 is set up in the descent position for downhill skiing in such a way that the ski boot 100 is released from the front unit 10 in the event of a force acting on the bearing portions 16a, 16b that exceeds a predetermined threshold value, for example in the event of a fall. In the walking position, the heel unit is not intended to hold the heel portion of the ski boot 100, such that the ski boot 100 can pivot about the ski transverse axis in engagement with the bearing portions 16a, 16b for the ascent. Release of the ski boot 100 by the front unit 10 is prevented or made more difficult in the walking position.

The longitudinal positioning portion 40 is secured relative to the bearing portions 16a, 16b in the open position and is movable relative to the bearing portions 16a, 16b in the closed position. This means that, in the closed position of the front unit 10, the longitudinal positioning portion 40 can move in relation to the front unit 10 or to the bearing portions 16a, 16b, in particular can move with the ski boot 100 with every step of the ascent, so as not to limit the freedom of movement of the ski boot 100 when walking and to allow pivoting of the ski boot 100 in the closed position of the front unit 10.

Furthermore, in the open position, the longitudinal positioning portion 40 can be put in a first position for supporting the ski boot 100 in the entry position, the longitudinal positioning portion 40 being locked in the first position in the open position and, in the closed position, being shiftable between the first position and a second position, in which it allows the ski boot 100 to pivot about the ski transverse axis for walking, the longitudinal positioning portion 40 being locked neither in the first position nor in the second position in the closed position. As a result, in the open position, the locked longitudinal positioning portion 40 provides an entry aid for correct positioning of the ski boot 100 relative to the bearing portions 16a, 16b, while in the closed position the longitudinal positioning portion 40 is not locked and thus a movement of the front portion 130 of the ski boot 100, in particular a pivoting of the ski boot 100 about the bearing portions 16a, 16b and the ski transverse axis, is not hindered.

Since the heel portion of the ski boot 100 is held by a heel unit in the descent position and the ski boot 100 is thus secured between the front unit 10 and heel unit and is not pivoted about the ski transverse axis, the longitudinal positioning portion 40 can remain in the first, in particular upright, position. In the walking position, however, the heel portion of the ski boot is released and the ski boot 100 can be pivoted about the ski transverse axis.

The longitudinal positioning portion 40, which is movable in the closed position and thus also in the walking position, can now move with the pivoting movement of the ski boot 100 and it does not restrict the movement of the ski boot 100 during ascent.

The longitudinal positioning portion 40 may be a stop element 40 and may comprise at least one stop 42a, 42b or a stop surface 42a, 42b, against which a front portion 130 of the ski boot 100 strikes in the entry position. A direct interaction between the front portion 130 of the ski boot 100 and the longitudinal positioning portion 40 in the form of a direct stop 42a, 42b can make it much easier for the user to correctly position the ski boot 100 relative to the bearing portions 16a, 16b in the ski longitudinal direction. In the preferred embodiment of the invention, two stops 42a, 42b arranged symmetrically with respect to the ski longitudinal axis may be provided. The user can move the ski boot 100 in such a way that it strikes against both stops 42a, 42b, as a result of which, in addition to correct positioning in the ski longitudinal direction, lateral twisting of the ski boot 100 can also be prevented. In this way, ease of entry can be further improved in the preferred embodiment.

The longitudinal positioning portion 40 may be mounted on the front unit 10 on a bearing shaft 44 that extends substantially orthogonally to the ski longitudinal axis and parallel to the ski transverse axis. Therefore, the longitudinal positioning portion 40 can pivot with the ski boot 100 in the walking position of the front unit 10 during ascent, and pivoting of the ski boot 100 about the ski transverse axis is not hindered by the longitudinal positioning portion 40.

The front unit 10 may further comprise a base plate 12 having a fastening arrangement 14 for fastening to a ski. The base plate 12 can be securely mounted on a ski, for example by means of screws to be inserted into screw holes 14. The bearing shaft 44, on which the longitudinal positioning portion 40 is mounted, may in particular be arranged on the base plate 12. Arranging the longitudinal positioning portion 40 on a base plate 12 that is secured to the ski is particularly advantageous, since the longitudinal positioning portion 40 can thereby be locked particularly securely in the first position. In addition, it is not necessary to couple the movement of the longitudinal positioning portion 40 with that of other movable components of the front unit 10.

In the first position, the longitudinal positioning portion 40 can protrude upwards substantially perpendicularly from the front unit 10 and, in the second position, can be pivoted forwards and downwards about the bearing shaft 44 such that it approaches the ski plane during the transition from the first position to the second position. In other words, the longitudinal positioning portion 40 can protrude perpendicularly upwards in the open position of the front unit 10 when it is locked in the first position, and in the closed position, in particular the walking position, of the front unit 10, it can pivot away forwards and downwards about the bearing shaft 44 into the second position.

In the advantageous embodiment, in the open position of the front unit 10, the ski boot 100 can be brought up to the longitudinal positioning portion 40 from behind until a front sole portion 130 of the boot 100 hits the rear contact surface 42a, 42b. The ski boot 100 is then supported in an entry position, the rear contact surface 42a, 42b acting as the longitudinal positioning portion 40. In the entry position, the bearing openings or counter bearing portions 110 of the ski boot 100 are positioned, with regard to their position along the X direction (ski longitudinal axis), in a position ready for engagement with the bearing portions or bearing journals 16. This means that the bearing journals 16 are exactly opposite the bearing openings 110 of the ski boot 100, such that when the front unit 10 is subsequently closed, the bearing journals 16 can slide into the bearing openings 110 of the ski boot 100 without any problems and snap into place. The rear contact surface 42a, 42b thus forms a front stop against which a front portion 130 of the ski boot 100 strikes in the entry position in order to position the boot such that it is ready for engagement.

As can be seen in FIG. 3, the longitudinal positioning portion 40, which is shiftable between the first and second positions, can be preloaded in the direction of the first position by a resilient means 46, which may preferably be a leg spring 46. In particular, in the open position, the longitudinal positioning portion 40, which is preloaded into the first position and locked in the first position, can provide support for the ski boot 100 and thus an entry aid, while in the closed position, in particular in the walking position, the longitudinal positioning portion 40 moves together with the front portion 130 of the ski boot 100 with every step. Such a movement of the longitudinal positioning portion 40 can take place from the first position to the second position counter to the preload force of the resilient element 46, which should be just sufficient to bring the longitudinal positioning portion 40 reliably into the first position. A leg spring 46 may preferably be wound around the pivot shaft 44 of the longitudinal positioning portion or stop element 40, which leg spring preloads the longitudinal positioning portion or stop element backwards (i.e. clockwise in the figures) such that it is preloaded into the first, in particular upright, position.

In addition, the front unit 10 may comprise two clamping brackets 18a, 18b, at least one of which is held on the base plate 12 so as to be pivotable about a shaft 20a, 20b. Each of the clamping brackets 18a, 18b may have a first leg 18a-1, 18b-1, at the distal end of which one of the bearing portions 16a, 16b is arranged. The clamping brackets 18a, 18b may in particular be held on the base plate 12 in each case via a pivot shaft 20a, 20b that extends parallel to a ski central axis, such that the clamping brackets 18a, 18b can be pivoted about the pivot shafts 20a, 20b. Each clamping bracket 18a or 18b may comprise the first leg 18a-1, 18b-1, which may protrude upwards with respect to a ski plane defined by the ski (the plane in which a running surface of the ski lies), i.e. approximately in a vertical direction that extends orthogonally to the ski plane. Furthermore, each clamping bracket 18a, 18b may comprise a second leg 18a-2, 18b-2, which extend from the first leg 18a-1, 18b-1 to the ski central axis of the ski and may be oriented approximately parallel to the ski plane.

Distal ends (ends remote from the pivot shafts 20a, 20b) of the second legs 18a-2, 18b-2 of the clamping brackets 18a, 18b may each be extended towards the ski central axis by means of at least one pin (not shown) arranged on the second legs 18a-2, 18b-2. The pins may be slidably inserted, by the ends thereof facing the ski central axis, into holes in end caps 32a, 32b, it being possible to insert the pin of one clamping bracket 18a into a hole in a first end cap 32a and it being possible to insert the pin of the other clamping bracket 18b into a hole in a second end cap 32b. A compression spring 34 may be wound around each of the pins, it being possible for each of the springs 34 to be supported on the distal end of the clamping bracket 18a, 18b on one side and on the end cap 32a, 32b on the other in order to preload the end caps 32a, 32b in a direction that leads away from the clamping brackets 18a, 18b, i.e. in the direction in which the two end caps 32a, 32b approach one another, such that the end caps 32a, 32b rest against one another and are pressed against one another.

Distal ends of the first legs 18a-1, 18b-1 may each have one of the bearing portions 16a, 16b. In the preferred embodiment of the present invention, the bearing portions 16a, 16b may in particular be in the form of bearing journals 16a, 16b that each protrude inwards from the first leg 18a-1, 18b-1, i.e. towards the ski central axis, and taper to a conical point at their protruding ends. The tips of the bearing journals 16a, 16b may therefore point approximately towards one another.

In addition, one or both of the clamping brackets 18a, 18b may be spring-loaded by means of at least one resilient element 34, which may in particular be in the form of compression springs 34, and the bearing portions 16a, 16b, in particular in the form of bearing journals 16a, 16b, may be preloaded into the closed position or the open position by overcoming a dead point position of one or both clamping brackets 18a, 18b.

In addition, the front unit may further comprise an actuation arrangement 26, 28 which, when actuated by a user, is designed to shift the front unit 10 from the open position into the closed position and thereby move the bearing portions 16a, 16b towards one another. The actuation arrangement may also be designed to secure the longitudinal positioning portion 40 in the first position. The actuation arrangement 16, 28 may consist of an actuation lever 26 and a blocking lever 28.

The actuation lever 26 may in particular be designed to have two arms and may be held on the base plate 12 so as to be pivotable about an actuation lever pivot shaft (not shown) that extends substantially orthogonally to the ski central axis and substantially parallel to the ski plane. A first arm of the actuation lever 26 may extend from the actuation lever pivot shaft (not shown) to the end caps 32a, 32b of the clamping brackets 18a, 18b and grip around the end caps 32a, 32b by means of an end portion, e.g. in the form of a fork or a receptacle. The end portion may have the closing actuation portion 30, which extends in the form of a first plate portion from the first arm a certain distance over the end caps 32a, 32b, and a second plate portion (not shown), which extends from the first arm a certain distance under both end caps 32a, 32b. The end caps 32a, 32b may thus be received between the plate portions of the actuation lever 26 and a pivoting movement of the actuation lever 26 about the actuation lever pivot shaft (not shown) can be coupled in motion with a pivoting movement of the clamping brackets 18a, 18b about the pivot shafts 20a, 20b.

As can be seen in FIGS. 3 and 6, a detent pin 27 may be arranged on the actuation lever 26, which detent pin is designed to engage in a corresponding detent notch 48 arranged on the longitudinal positioning portion 40 in the open position of the front unit 10 in order to lock the longitudinal positioning portion 40 in the first position in the open position of the front unit 40. The longitudinal positioning portion 40 can be reliably locked in the first position by means of the detent pin 27 and the detent notch 48. A projection formed integrally on the actuation lever 26 and a corresponding complementarily formed recess in the longitudinal positioning portion 40 would also be conceivable as an alternative to the detent pin 27 and the detent notch 48.

The blocking lever 28 may be held on a distal end portion of the actuation lever 26 pointing forwards in the ski longitudinal direction so as to be pivotable about a blocking lever pivot shaft 29 that is substantially parallel to the ski plane. A second arm of the actuation lever 26 may extend from the actuation lever pivot shaft (not shown) substantially in the opposite direction to the first arm and may be connected to the blocking lever 28 at its distal end. The blocking lever 28 may have an operating portion 28-1 and a blocking portion 28-2, which may extend from the blocking lever pivot shaft 29 in different, in particular substantially opposite directions, as opposing arms.

The front unit 10 can be locked in the closed position by means of the blocking lever 28. The blocking lever 28 may be shiftable between a blocking position and a release position and may be designed to lock the front unit 10 in the closed position in the blocking position, for example by means of the blocking portion 28-2 interacting with the base plate 12.

In the open position, the longitudinal positioning portion 40 can be held in position on the actuation lever 26 or locked in the first position by means of the detent pin 27. In the descent position, can move downwards by means of the entry of the actuation lever 26, the detent pin 27, which keeps the longitudinal positioning portion 40 locked, can perform a rotational movement and release the longitudinal positioning portion 40. In the event of a fall or the like, the longitudinal positioning portion 40 does not prevent the front unit 10 and the ski boot 100 from being released. As in the descent position, the longitudinal positioning portion 40 is also freely movable in the walking position and can move away forwards against the force of the spring 46 acting on it by means of a pivoting movement of the ski boot 100 during walking.

Together with the clamping brackets 18a, 18b, the actuation arrangement 26, 28 of the front unit 10 can form a movement apparatus 18a, 18b, 26, 28 for moving the bearing portions 16a, 16b between the open position and the closed position of the front unit 10, it being possible for the movement apparatus 18a, 18b, 26, 28 to have a closing actuation portion 30, the actuation of which causes a movement of the bearing portions 16a, 16b from the open position into the closed position. The closing actuation portion 30 may define a substantially planar tread surface 30 for a front sole portion of the ski boot. In the present embodiment, a planar tread surface 30 of this kind may be present in particular as a planar plate portion 30, but may alternatively also be defined, for example, by a plurality of contact points at a sufficient distance from one another. In this context, it is advantageous that a planar support is provided for the ski boot 100, in particular for a sole portion 120 of the ski boot 100, such that it is even easier for the user to correctly align the ski boot 100 with respect to the front unit 10 in order to couple the bearing portions 16a, 16b to the counter bearing portions 110. The movement apparatus 18a, 18b, 26, 28 may accordingly convert a movement of the closing actuation portion 30 directed towards the ski plane into an approaching movement of the bearing portions 16a, 16b in order to move the bearing portions 16a, 16b into the closed position of the front unit 10. The clamping brackets 18a, 18b having the spring-loaded end caps 32a, 32b and the actuation arrangement, consisting of the actuation lever 26 and blocking lever 28, can thus form the movement apparatus together.

The mode of operation of the front unit 10 of the preferred embodiment of the invention is explained below with reference to FIGS. 1 to 7. It should be noted that the invention is not restricted to this embodiment and the described operating procedures of the front unit 10 are only intended to be given by way of example.

A user can get into the front unit 10 using the ski boot 100 when the clamping brackets 18a, 18b are in the open position shown in FIGS. 1 and 3, in which open position the end caps 32a, 32b are moved into the top position with the end portion 30 and the bearing journals 16a, 16b are accordingly pivoted outwards. The bearing portions or bearing journals 16a, 16b can then be far enough apart such that a sole portion 120 of a ski boot 100 can be inserted between them with as little clearance as possible. A running surface of the sole portion 120 may be placed on the closing actuation portion 30 and may be supported from above on the closing actuation portion 30. The ski boot 100 can be guided forwards until it strikes the stop surfaces 42a, 42b of the longitudinal positioning portion 40. The ski boot 100 is then in the correct entry position in relation to the bearing portions/bearing journals 16a, 16 in the vertical direction on account of the closing actuation portion 30 and in the ski longitudinal direction on account of the longitudinal positioning portion 40 and the stop surfaces 42a, 42b thereof.

The end portion 30 can then move towards the ski by means of the ski boot exerting a force directed towards the ski on the closing actuation portion 30 (and/or by manual pivoting actuation of the blocking lever 28). The end portion 30 can take the end caps 32a, 32b with it and pivot the clamping brackets 18a, 18b about the pivot shafts 20a, 20b. Accordingly, the bearing journals 16a, 16b can approach one another and move in the direction of the ski boot. This movement can take place against the resistance of the compression springs 34, since a contact point between the end caps 32a, 32b in the open position can be above a connecting line between the pivot shafts 20a, 20b. Accordingly, the contact point approaching the connecting line can mean a reduction in the respective distances between the end caps 32a, 32b and the clamping brackets 18a, 18b and thus a compression of the compression springs 34.

When the end caps 32a, 32b are approximately at the level of the connecting line, the movement apparatus can reach a dead point in which the resistance of the compression springs 34 against the end caps 32a, 32b approaching the connecting line changes to an acceleration of the end caps 32a, 32b further towards the ski as a result of the force of the springs 34. The force of the springs 34, which in this case can always push the end caps 32a, 32b away from the connecting line, can thus cause the movement apparatus to change over at the dead point and automatically push the clamping brackets 18a, 18b towards a closed position in which the bearing journals 16a, 16b are preloaded so as to approach one another.

The closing actuation portion 30 can, at the latest when it passes through the dead point, be at a height above the ski that positions the ski boot 100 supported on the closing actuation portion 30 at a correct height in relation to the bearing journals 16a, 16b, such that bearing holes of the ski boot 100 are approximately at the same height as the bearing journals 16a, 16b, such that the bearing journals 16a, 16b can securely engage in the bearing holes 110 during the further movement of the movement apparatus into the closed position. The clamping brackets 18a, 18b can be stably preloaded by the action of the compression springs 34 described above. The front unit 10 is in the descent position. Now, either an associated heel unit can be coupled to a heel portion of the ski boot 100 for the descent or the front unit 10 can be shifted into the walking position for an ascent in that, in order to reliably prevent pivoting of the clamping brackets 18a, 18b into the open position due to a force applied by the ski boot 100 to the bearing journals 16a, 16b, the blocking lever 28 is additionally pivoted into a blocking position in which a distal end of the blocking portion 28-2 is supported on the ski below the blocking lever pivot shaft 29, such that a movement of the second arm of the actuation lever 26 towards the ski and thus an upward movement of the end portion 30 is blocked. The front unit 10 is now in the walking position and the clamping brackets 18a, 18b and thus also the bearing pins 16a, 16b are prevented from moving apart, or at least this is made more difficult. In the walking position, the longitudinal positioning portion in the form of the stop element 40 can be moved relative to the bearing journals 16a, 16b and, in particular, can be pivoted about the shaft 44 fastened to the base plate 12. As can be seen in FIG. 7, the front portion 130 of the ski boot 100 strikes the stop surfaces 42a, 42b of the longitudinal positioning portion 40 with each step of the user and pivots same forwards and downwards counter to the spring force of the leg spring 46, which is also mounted on the shaft 44 (in this case anti-clockwise). Since the actuation lever 26 and thus also the detent pin 27 moves downwards during the shifting from the open position into the closed position and the engagement between the detent pin 27 on the actuation lever 26 and the detent notch 48 on the longitudinal positioning portion 40 has been released, the longitudinal positioning portion 40 can be moved, in particular rotated about the shaft 44, and can pivot with the pivoting movement of the ski boot 100 during walking.

In order to open the front unit 10, the blocking lever 28 can first be pivoted back from the blocking position, such that the distal end 28-2 is released from contact with the upper face of the base plate 12. The blocking lever 28 can then be gripped on the operating portion 28-1 and moved towards the ski, such that the actuation lever 26 pivots and the end portion moves upwards. The movement apparatus can oppose this opening movement the resistance of the springs 34 until the end caps 32a, 32b again pass through the dead point at the level of the connecting line between the pivot shafts 20a, 20b. The springs 34 can then automatically push the end caps 32a, 32b further upwards in the direction of the open position and finally hold the clamping brackets 18a, 18b in the open position. The bearing journals 16a, 16b can thereby disengage from the bearing holes 110 and the ski boot 100 can finally be pulled out of the front unit 10. In the open position, the longitudinal positioning portion 40 is again secured with respect to the bearing portions 16a, 16b and can serve as an entry aid.

The invention claimed is:

1. A front unit for a touring binding, comprising:

two lateral bearing portions arranged on a ski transverse axis that extends substantially orthogonally to a ski longitudinal axis and parallel to a ski plane, wherein, when the front unit is in a closed position, the two lateral bearing portions are configured to engage lateral counter bearing portions of a ski boot to hold the ski boot on the front unit so that the ski boot can pivot about the ski transverse axis; and a longitudinal positioning portion on which the ski boot can be supported in an entry position, wherein the *lateral* counter bearing portions are positioned, with regard to their position along the ski longitudinal axis, in a position for engagement relative to the *lateral* bearing portions, the front unit being shiftable between an open position and the closed position, wherein:

in the open position of the front unit, the *lateral* bearing portions and the counter bearing portions are disengaged, the longitudinal positioning portion is secured relative to the *lateral* bearing portions and the longitudinal positioning portion is put in a first position for supporting the ski boot in the entry position, the longitudinal positioning portion being locked in the first position in the open position, *wherein in the first position the longitudinal positioning portion protrudes upwards substantially perpendicularly from the front unit and orthogonal to the ski longitudinal axis,* and in the closed position of the front unit, the *lateral* bearing portions and the *lateral* counter bearing portions are engaged and the longitudinal positioning portion can be [moved] *pivoted* relative to the front unit [or to the bearing portions.] *from the first position to a second position* with the ski boot in every step, *wherein the second position is forwards of the first position relative to a forward direction of the ski boot, such that the longitudinal positioning portion approaches the ski plane during a transition from the first position to the second position,* and wherein the longitudinal positioning portion is preloaded in a direction of the first position by a resilient means.

2. The front unit of claim 1, wherein the resilient means comprises a leg spring.

3. The front unit of claim 1, further comprising an actuation arrangement which, when actuated is configured to shift the front unit from the open position into the closed position and thereby move the *lateral* bearing portions towards one another.

4. The front unit of claim 3, wherein the actuation arrangement is further configured to secure the longitudinal positioning portion in the first position.

5. The front unit of claim 3, wherein the actuation arrangement comprises an actuation lever on which a detent pin is arranged.

6. The front unit of claim 1, wherein the longitudinal positioning portion is arranged in front of the *lateral* bearing portions in a ski longitudinal direction.

7. The front unit of claim 1, wherein the longitudinal positioning portion comprises at least one stop, wherein a front portion of the ski boot strikes in the entry position against the at least one stop.

8. The front unit of claim 1, wherein the longitudinal positioning portion is mounted on the front unit on a bearing shaft that extends (A) substantially orthogonally to the ski longitudinal axis and (B) parallel to the ski transverse axis.

9. The front unit of claim 8, further comprising a base plate having a fastening arrangement for fastening the front unit to a ski, wherein the bearing shaft is arranged on the base plate.

[10. The front unit of claim 1, wherein, in the first position, the longitudinal positioning portion protrudes upwards substantially perpendicularly from the front unit.]

[11. The front unit of claim 1, wherein in the closed position of the front unit, the longitudinal positioning portion is shiftable between the first position and a second position, the second position allowing the ski boot to pivot about the ski transverse axis for walking, the longitudinal positioning portion being locked neither in the first position nor in the second position in the closed position.]

12. The front unit of claim 5, wherein the detent pin is configured to engage in a corresponding detent notch arranged on the longitudinal positioning portion in the open position of the front unit to lock the longitudinal positioning portion in the first position in the open position of the front unit.

[13. The front unit of claim 8, wherein in a first position, the longitudinal positioning portion protrudes upwards substantially perpendicularly from the front unit, wherein, in a second position, the longitudinal positioning portion is pivoted away forwards and downwards about the bearing shaft such that the longitudinal positioning portion approaches the ski plane during a transition from the first position to the second position.]

14. A front unit for a touring binding, comprising:

two lateral bearing portions arranged on a ski transverse axis that extends substantially orthogonally to a ski longitudinal axis and parallel to a ski plane, wherein, when the front unit is in a closed position, the two lateral bearing portions are configured to engage lateral counter bearing portions of a ski boot to hold the ski boot on the front unit so that the ski boot can pivot about the ski transverse axis; and a longitudinal positioning portion on which the ski boot can be supported in an entry position, wherein the *lateral* counter bearing portions are positioned, with regard to their position along the ski longitudinal axis, in a position for engagement relative to the *lateral* bearing portions, the front unit being shiftable between an open position and the closed position, wherein:

in the open position of the front unit, the *lateral* bearing portions and the *lateral* counter bearing portions are disengaged, the longitudinal positioning portion is secured relative to the *lateral* bearing portions, and the longitudinal positioning portion is put in a first position for supporting the ski boot in the entry position, the longitudinal positioning portion being locked in the first position in the open position, *wherein in the first position the longitudinal positioning portion protrudes upwards substantially perpendicularly from the front unit and orthogonal to the ski longitudinal axis,* and in the closed position of the front unit, the *lateral* bearing portions and the *lateral* counter bearing portions are engaged and the longitudinal positioning portion can be [moved] *pivoted* relative [to the front unit or] to the *lateral* bearing portions[.] *from the first position to a second position* with the ski boot in every step, wherein the second position is forwards of the first position relative to a forward direction of the ski boot, such that the longitudinal positioning portion approaches the ski plane during a transition from the first position to the second position, and wherein the longitudinal positioning portion is preloaded in a direction of the first position by a resilient means.

15. A front unit for a touring binding, comprising:

two lateral bearing portions arranged on a ski transverse axis that extends substantially orthogonally to a ski longitudinal axis and parallel to a ski plane, wherein, when the front unit is in a closed position, the two lateral bearing portions are configured to engage lateral counter bearing portions of a ski boot to hold the ski boot on the front unit so that the ski boot can pivot about the ski transverse axis; and a longitudinal positioning portion on which the ski boot can be supported in an entry position, wherein the *lateral* counter bearing portions are positioned, with regard to their position along the ski longitudinal axis, in a position for engagement relative to the *lateral* bearing portions, [wherein, in an open position of the front unit, the longitudinal positioning portion is put in a first position for supporting the ski boot in the entry position, the longitudinal positioning portion being locked in the first position in the open position, the front unit being shiftable between an open position and the closed position, wherein:]

*wherein,* in [the] *an* open position of the front unit, the *lateral* bearing portions and the *lateral* counter bearing portions are disengaged, the longitudinal positioning portion is secured relative to the *lateral* bearing portions, and [the longitudinal positioning portion is put in a first position for supporting the ski boot in the entry position, the longitudinal positioning portion being locked in the first position in the open position,] *wherein in a first position the longitudinal positioning portion protrudes upwards substantially perpendicularly from the front unit and orthogonal to the ski longitudinal axis,* and

*wherein* in [the] *a* closed position of the front unit, the *lateral* bearing portions and the *lateral* counter bearing portions are engaged and the longitudinal positioning portion can be [moved] *pivoted* relative to the front unit or to the *lateral* bearing portions[.] *from a first position to a second position* with the ski boot in every step, *wherein the second position is forwards of the first position relative to a forward direction of the ski boot, such that the longitudinal positioning portion approaches the ski plane during a transition from the first position to the second position,* and wherein the longitudinal positioning portion is preloaded in a direction of the first position by a resilient means.

* * * * *